UNITED STATES PATENT OFFICE.

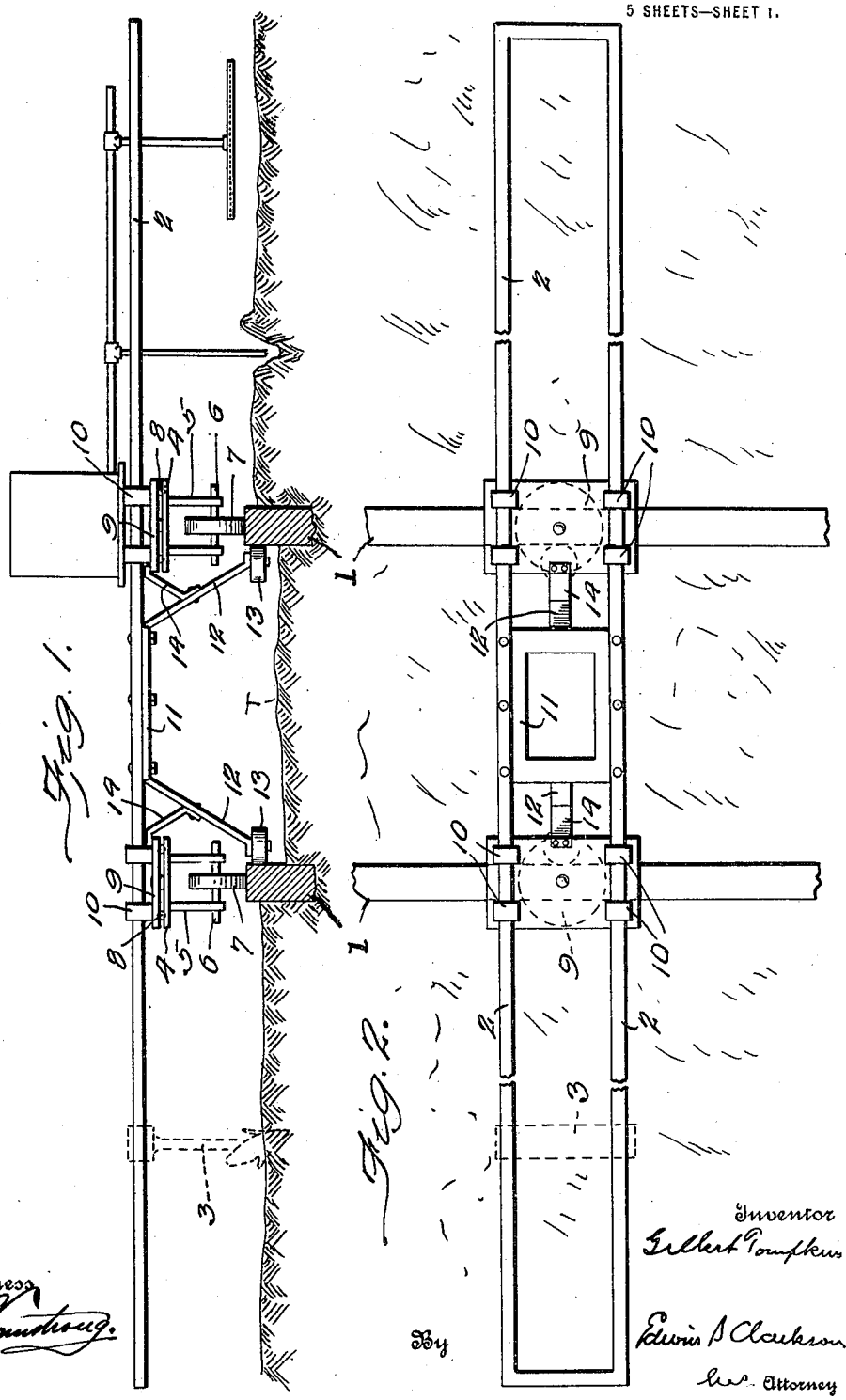

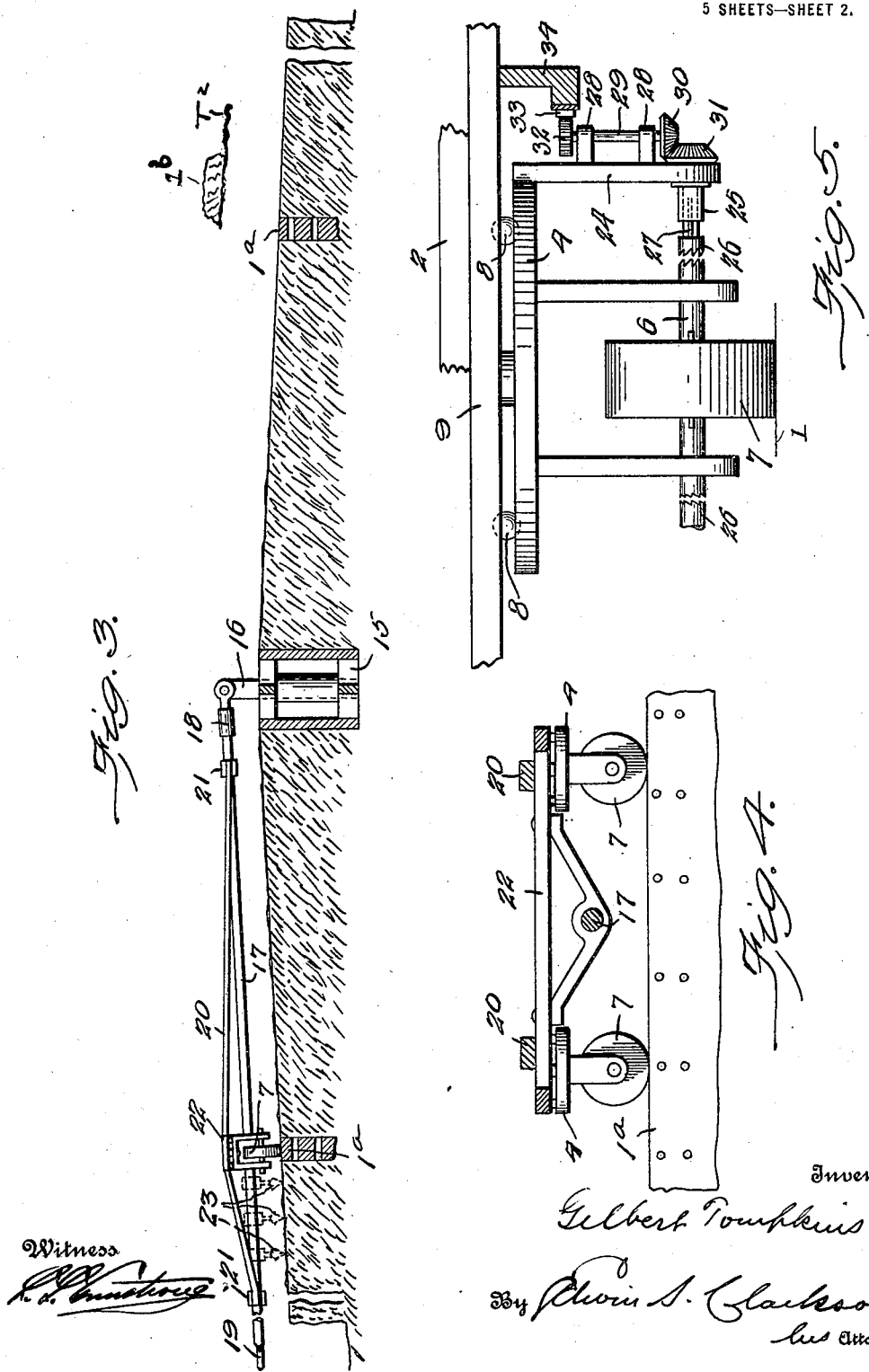

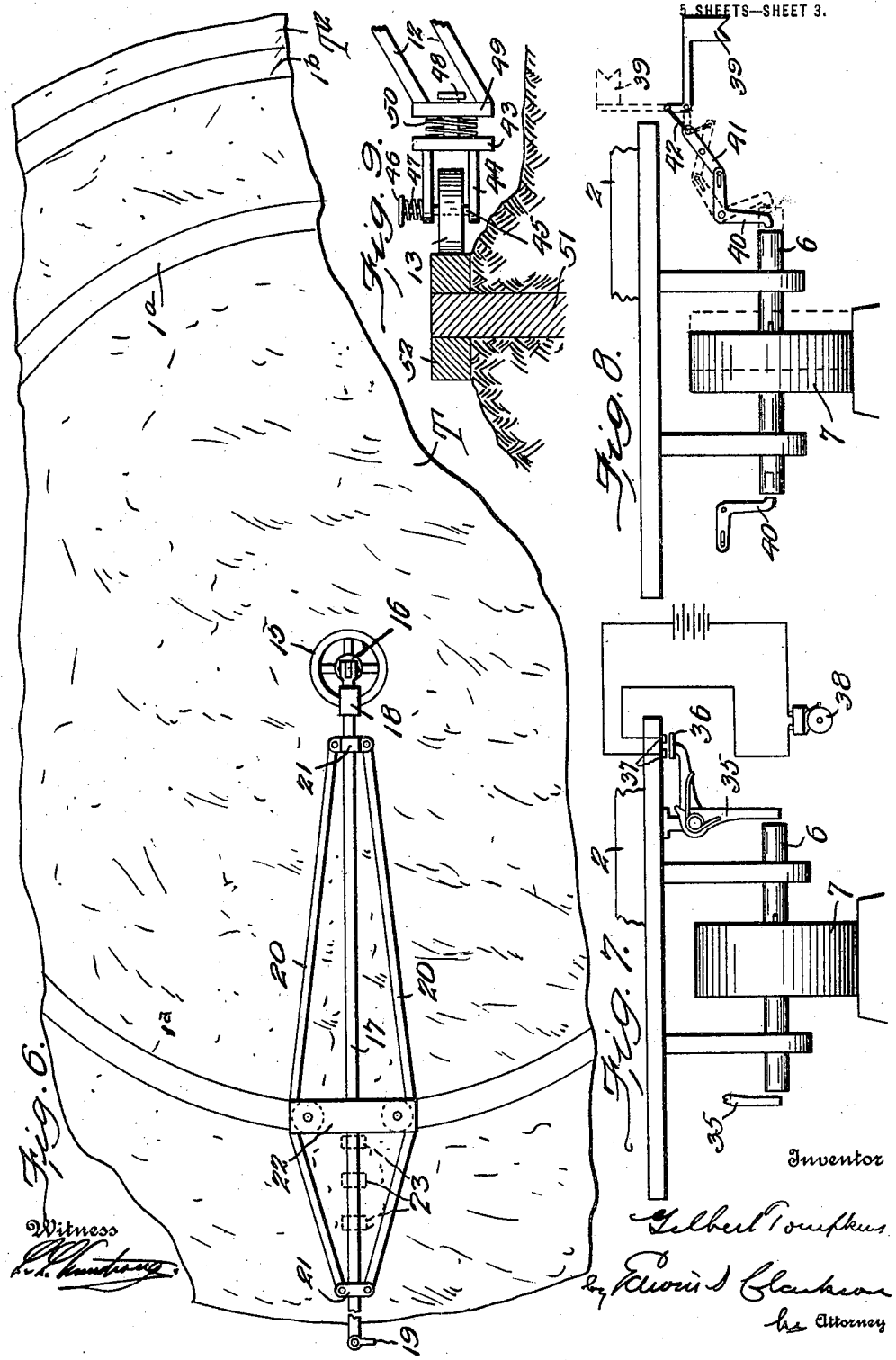

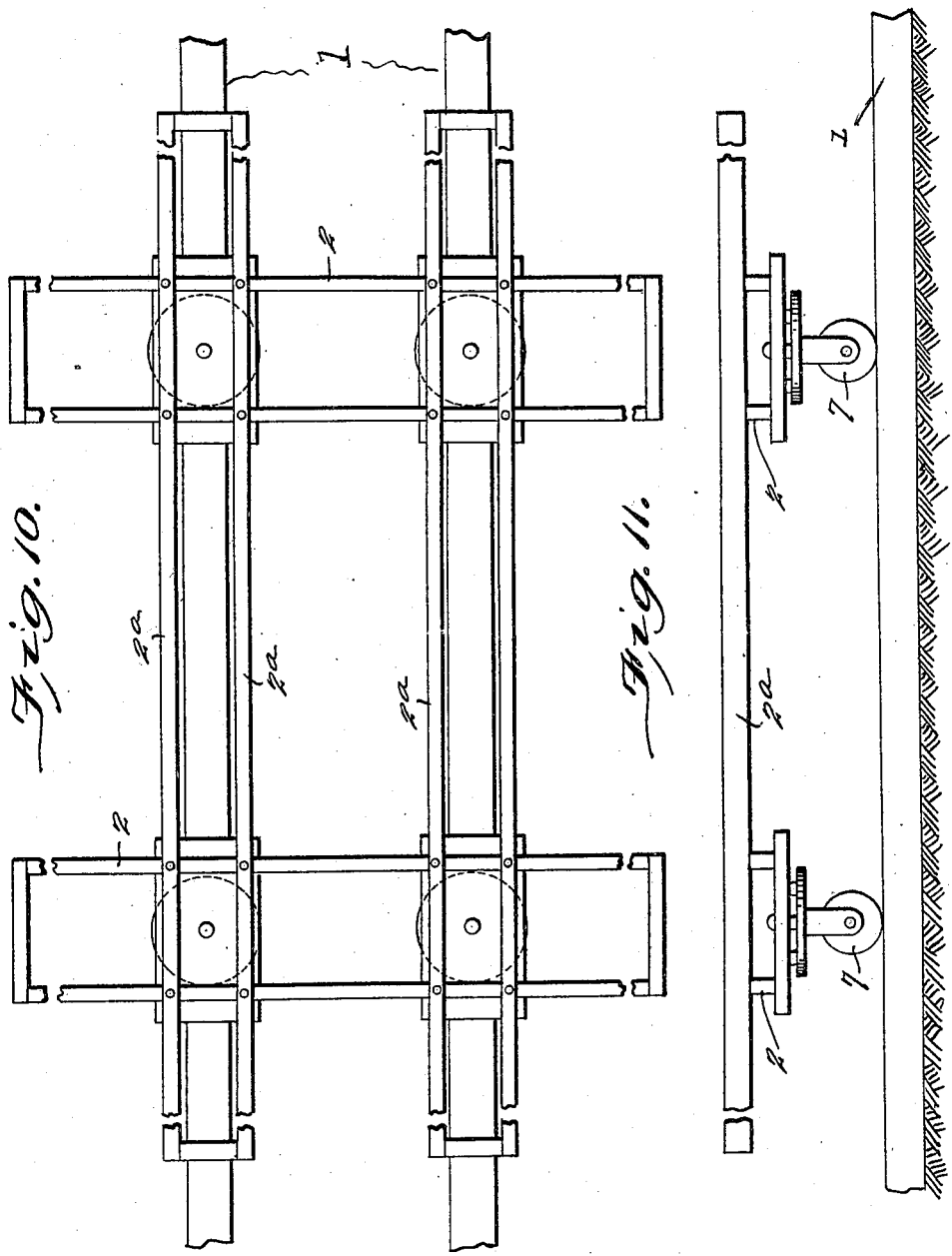

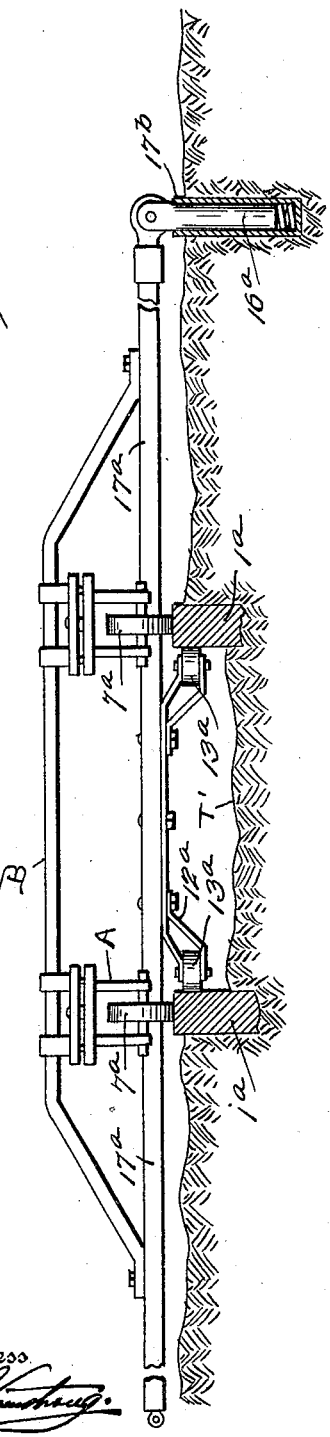
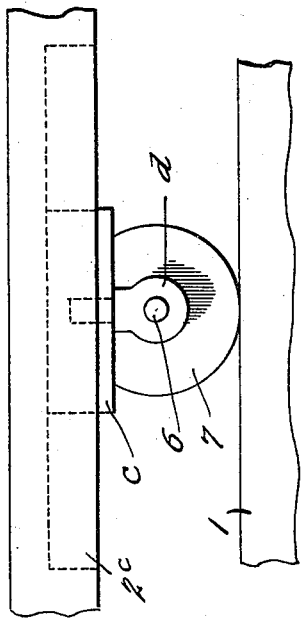
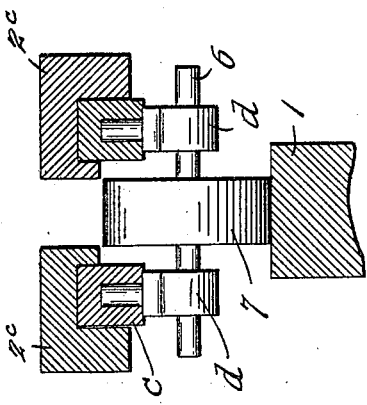

GILBERT TOMPKINS, OF THOMPSON, CONNECTICUT.

AGRICULTURAL IMPLEMENT.

1,394,651.  Specification of Letters Patent.  Patented Oct. 25, 1921.

Application filed December 30, 1919. Serial No. 348,258.

*To all whom it may concern:*

Be it known that I, GILBERT TOMPKINS, a citizen of the United States, residing at Thompson, in the county of Windham and State of Connecticut, have invented certain new and useful Improvements in Agricultural Implements, of which the following is a specification.

In the drawing:

Figure 1 is a rear elevation of one end of a machine embodying my invention.

Fig. 2 is a top plan view of the same.

Fig. 3 is a rear elevation of another embodiment of my invention.

Fig. 4 is a detail side elevation of one form of truck used in support of the beam 17 as shown in Fig. 3.

Fig. 5 is an elevation of a form of truck that may be used in either Figs. 1 or 3.

Fig. 6 is a top plan view of the embodiment shown in Fig. 3.

Figs. 7 and 8 are end elevations of trucks with signal actuating means.

Fig. 9 is an enlarged detail view.

Fig. 10 is a top plan view of the connecting frames and main frames.

Fig. 11 is a side elevation of Fig. 10.

Fig. 12 is a side elevation of another embodiment of my invention.

Figs. 13 and 14 are detail views of still further embodiments.

The object of my invention is to provide means for soil preparation, planting, cultivating and other operations employed in growing field or garden crops; and with this and other objects in view my invention consists of the parts and combination of parts as will be hereinafter pointed out.

The reference numeral 1, designates a runway which may be constructed of any desired and suitable material in any convenient dimension. These runways are smooth on top and are placed at predetermined distances apart throughout the field or plot to be worked, singly as in Figs. 3 and 6, or in pairs as in Figs. 1, 2, 10, 11, 12. The end frame 2 may be constructed of any suitable material and may be of different shapes according to the space within which it is intended to be worked. Any desired earth implement 3 such as a plow, cultivator tooth and the like, or any form of seed sowing or planting devices, or any variety of spraying, gathering cutting harvesting or carrying machinery, or any suitable form of tank or container for water or other liquid, powder or solid, or any form of hose or pipe or sprinkler, with ditch-opening or covering teeth or mold boards as desired, may be secured by suitable means to the end frame 2 to the connecting frame 2ª or any extension thereof.

The end frames 2 are supported on trucks which I will now describe. The main truck body 4 is provided with pedestals 5 in the lower ends of which the journal 6 is journaled, said journal having keyed thereto a traction wheel 7 having preferably a broad tread which is adapted to run on the top face of the runways or stone-ways 1. The top face of the truck is provided with ball races in which anti-friction balls are positioned. A cover plate 9 having ball runways is placed over the main truck body 4 and has suitable connection therewith; said plate 9 being secured to the frame 2 by means of the straps 10. The journals 6 are free to move bodily sidewise in pedestals 5.

A suitable brace 11 is secured to the frame 2 and is provided with depending arms 12 to the lower ends of which are journaled suitable guide wheels 13 adapted and positioned to bear against the side face of the runway 1 or 1ª. Braces 14 extend between and are secured to the arms 12 and the top plates 9 of the truck.

In adapting my invention for use on a circular bed, as shown in Fig. 6, I lay one or more circular runways 1ª. At the center of the bed I position a box 15 in which a post 16 is revolubly mounted, the top of the post projecting a suitable distance above the box 15 as shown in Fig. 3.

A beam 17 is secured at its inner end to the top of the post 16 and is provided near its inner end with a swivel 18. A clevis 19 is secured to the outer end of the beam to which suitable power may be attached; or the power may be applied in the traction path T¹ and be coupled to the truck at or near the center line of said traction path, T¹, Fig. 12. Braces 20 are connected to the beam 17 by suitable clamps 21. The frame comprising the beam 17 and braces 20 is mounted on a truck 22 similar to the one described in connection with Figs. 1 and 2. Suitable cultivating implements 23 are detachably connected to the beam 17 and may be adjusted as required. Of course it is obvious that in the use of my device soil working implements will be secured to the frame 17 between the runway and the post 16.

In order that the direction of the movement of the important supporting wheels 7 may not be the cause of unnecessary strain on any of the frames or their guide wheels, such supporting wheels are constructed as above described.

Should a supporting wheel and its revolving table or sliding socket block support be out of the true line in which the main frame is being directed by its guide wheels, or out of the fixed curve controlled by the sweep of the beam 17 as attached to the revoluble post 16, Fig. 3 and further controlled if desired by guide wheels 13, bearing on the upright side of the runways, such a supporting wheel with its keyed journal 6, will move toward one or the other of the pedestals 5; and unless this crowding is controlled, undue strain will be put on the main frame and traction power will be wasted.

This control is given in two ways:

1. By the shifting of either sliding socket block in its channel by hand power, or by automatic mechanism set in motion by the sidewise movement of the journal 6 in ways similar to those described below.

2. By the revolving of the wheel frame table support, which may be regulated in any of the following ways: By a hand wheel or turning device connected to the tables and extending above the frame 2. By an electric or other power device automatically set in motion by the side thrust of the journal 6 of the support wheel. By a gear and cog mechanism automatically set in motion by the above mentioned side thrust of the support wheel journal.

To further the control of the revolving truck or table supports of the wheel-support, the side thrust of the journal 6 (of any wheel that is crowding out of the true line of motion) may raise a signal flag as shown in Fig. 8, sound a bell as shown in Fig. 7 or start any other signaling device that will notify the operator that the direction controlling mechanism should either be set in motion (if it is to be done by him) or supervised if automatic control is in use.

The control of the revolving table or truck in Fig. 5 is as follows: The table 4 is provided with a depending arm 24 in the lower end of which is journaled a stub shaft 25 in one end of which is mounted a sliding clutch member 26 having suitable keys 27 which register with grooves in the stub shaft. The other clutch member is on the end of the journal 6. Suitable bearings 28 are on the arm 24 in which a shaft 29 is journaled, said shaft having at its lower end a beveled pinion 30, which is in mesh with a bevel pinion 31 keyed to the stub shaft 25. A pinion 32 is keyed to the upper end of the shaft 29 and engages a circular toothed rack 33 mounted on an arm 34 which depends from and is secured to the top plate 9.

If the support wheel 7 becomes tangent with the line of draft a continued movement causes a side thrust of the wheel and its journal 6 whereby the clutch on the journal engages the clutch member 26 and to prevent a sudden jar or strain the clutch does not begin to communicate motion to the stub shaft 25 until the keys 27 are moved into engagement with the grooves in the stub shaft, when the stub shaft is revolved the pinion 32 is revolved through the shaft 29 and gears 30, 31, and the pinion is thus caused to travel along the rack 33 and pull the revolving table and support wheel 7 with it until the angle of the journal 6 in reference to the line of motion is so altered that the support wheel 7 with its keyed journal 6 automatically moves in the direction opposite to that which first brought it into engagement with the stub shaft mechanism 25, 26, 27 and its dependent pinion etc., until the gear teeth are disengaged; and they remain so until a further sidewise movement of the journal 6 again engages the gear teeth at either end with the accompanying stub shaft mechanism.

In Fig. 7 the side thrust of the journal 6 causes it to engage a flexibly jointed bell crank lever 35 provided with a contact 36 on one of its arms which closes a circuit through the contacts 37 to the bell or other audible or visible signal 38, thereby notifying the operator that the support wheel 7 is at an angle to the line of draft.

In Fig. 8 the side thrust of the journal 6 causes a flag 39 to be raised as indicated in dotted lines. The mechanism for thus raising the flag consisting of a bell crank lever 40, one end of which is in the line of thrust of journal 6, while its other end has a pin and slot connection with a lever 41 connected to the flag mast by a link 42.

The mechanism described above for side draft may be advantageously used in preventing any up and down strains on the guide wheels 13. Any undue strain or pressure on the guide wheel mechanism may be signaled to the operator or controlled mechanically in ways similar to those shown in connection with the support wheel.

In Fig. 9 I provide a mounting for the guide wheel 13, comprising a base plate 43 having arms 44 between which the guide wheel is mounted on a shaft 45 which projects above the upper arm 44 and is provided with a head 46. A coil spring 47 is positioned around the shaft 45 between the head 46 and upper arm 44 to hold the wheel centrally between the arms 44 against gravity. A rod 48 extends from the base 43 through a plate 49 supported by the arms 12, and a coil buffer spring 50 is interposed between the base 43 and plates 49 to hold the guide wheel 13 to the side of the runway and to absorb any shocks which said guide wheel may receive. The runway may be of any suitable material such as wood, gravel, concrete, stone or metal; or they may be constructed of posts 51 against the top ends of which a runway of wood, metal or other material is secured.

Advantages of the use of these frames: After the placing of the supporting runways, the soil may be easily worked or accurately leveled, with the addition of furrows for planting or small trenches for irrigation if desired, at a low cost in effort or power for the reason that the pull in pounds that is needed to move a given weight or load carried on wheels running on smooth runways is but a fraction of the motive power needed to overcome the strain of dragging the same load on rough ground surface or in heavy soil.

Through the marking and guiding that may be done with these frames, planting may be so registered in straight line at such accurate intervals that close-up cultivation of the full working width of the frames may be given without danger to the roots or the stems of the plants. The number of rows thus cultivated at one working is limited only by the width of the frame that may economically be built and operated.

Cultivation may be given at any regulated depth. This means a great saving of power in the much needed light mulching of the top soil; and the danger of root damage is practically eliminated.

As the frames carry and direct the entire working load on their support and guide wheels, the soil of the planting beds need not be trampled by horse, man, or wheel; and a great source of waste is thereby cut off in rendering unnecessary the work to undo the effort of the packing of the earth under foot and wheel tire, and to bring back the soil to good tilth.

There is a decided saving of space needed for the use of a horse, or other tractor, between rows. All contact with the ground is concentrated in the traction paths, T, T¹, T²; which may be between the runways or stoneways as shown in Figs. 1 and 12, or in the space outside of the circular soil beds shown in Figs. 3 and 6, in which a traction path T², is shown encircling the soil bed, with the addition of a runway or stoneway in a modified form, 1ᵇ, which is but slightly raised above the level of said traction path, T² (and is of a general type that may be used in any situation in which guide wheels 13 are not needed). This embodiment is particularly useful in circular beds of limited diameter, in which a low-built runway or stoneway, 1ᵇ, may take the place of a higher runway, 1ᵃ, thereby saving soil surface and part of the labor of construction. The top of any runway or stoneway may be level with the surface of the soil or of a traction path, or higher or lower than such surfaces as may be best adapted to the mechanism used in any special form of work. An outer ring or band of soil may be cultivated or worked in any desired way through the opportunity given by a corresponding outward extension of the beam 17 supported by such additional framework as may be required. This accordingly becomes a simplified form of some such embodiment as that shown in Fig. 12. Additional power may be applied at the outer end of any such extension of the beam 17.

The material used in the making of these traction paths may be closely adapted to the best working surface for the kind of power to be used, tractor, horse, steer or the like, with the addition of implanted gears, cogs or posts of suitable design for receiving the thrust of any so applied power.

This preparation of the traction surface saves the loss in power incurred in plodding through deep or uncertain footing; and further saving of traction strength or power is gained through the free running of the wheels of the frames on the supporting and guiding runways or stoneways.

In Fig. 12 I have shown another embodiment of my invention for the circular bed work in which the trucks A are of the same construction as heretofore described in detail in connection with Fig. 1. In this embodiment the trucks are suitably secured to the truss frame B, which truss frame is secured at its ends to the bend 17ᵃ. In order to relieve the beam 17ᵃ from any thrust and to prevent any thrust from being transmitted to the center post 16ᵃ, which is adapted to unrestrained vertical movement so as not to interfere with the carrying of the weight of the frame and its attachments by the double set of supporting wheels 7ᵃ, which relieve the revoluble post 16ᵃ of all vertical load, I provide the guide wheels 13ᵃ, mounted upon the brackets 12ᵃ, which brackets are secured to the beam 17ᵃ. Said guide wheels are of the same construction as the guide wheels 13 heretofore described. In the bottom of the post pit 17¹, I arrange a coil spring upon which the post 16ᵃ rests to overcome gravity.

As shown in Figs. 13, and 14, a modified frame 2ᶜ may be made of channel iron, wood or other material, in the channel of which I slidably mount the blocks c to which the journal bearings d are revolubly secured in which the journal 6 is mounted carrying the wheel 7. These sliding blocks c may be controlled by hand or by mechanical devices similar to those heretofore described.

What I claim is:—

1. In a device of the character described the combination with a smooth runway, a support wheel mounted on said runway, a revoluble table secured to said wheel, and means operated by a side thrust of said wheel when it becomes at an angle to the line of draft to indicate such angular position of the support wheel and correct it.

2. In a device of the character described, a revoluble table, a shaft connected with said table and free to move endwise, a support wheel keyed to said shaft, whereby the wheel may move under a side thrust with said shaft, means operated by the side thrust of the shaft to restore said wheel to the line of draft in case it should move from said line, a frame mounted on said table, and soil tilling implements mounted on said frame.

3. In a device of the character described, a frame, a revoluble table having pivotal connection with said frame, a shaft carried by said table and free to move endwise, a support wheel keyed to said shaft, an arcuate rack suspended from said frame, gear and clutch mechanism between said rack and said shaft operable by the shaft when the shaft is moved under a side thrust whereby the table is revolved and the wheel and shaft returned to their normal positions.

4. In a device of the character described, a frame, a revoluble table having pivotal connection with said frame, a shaft carried by said table and free to move endwise, a support wheel keyed to said shaft, an arcuate rack carried by the frame, a pinion engaging said rack, and means actuated by a side thrust of the shaft to operate said pinion.

5. In a device of the character described, a frame, a revoluble table having pivotal connection with said frame, a shaft connected with said table and free to move sidewise, a support wheel keyed to said shaft, and a means between the plate and shaft to revolve the table actuated by a side movement of the shaft, whereby the said wheel is returned to the direct line of draft.

6. In a device of the character described the combination with a circular runway, a frame pivotally mounted at its inner end concentrically within said runway, soil tilling implements carried by said frame, support wheels secured to said frame and adapted to move on said runway, and means for correcting the line of draft of said wheels.

7. In a device for working a circular plot of ground, the combination with a circular runway concentric with said plot, a pivotally mounted post located in the center of said plot, a frame flexibly connected at its inner end to said post, support wheels secured to said frame and adapted to travel on said runway, means to insure the line of travel of the wheels concentric with the said post, and soil working implements carried by said frame.

8. In a device for working a circular plot of ground, the combination with a circular runway concentric with said plot, a pivotally mounted post located in the center of said plot, a frame hinged at its inner end to said post, support wheels secured to said frame and adapted to travel on said runway, means to insure the line of travel of the wheels concentric with said post, and soil working implements carried by said frame.

9. In a device for working a circular plot of ground, the combination with a circular runway concentric with said plot, a pivotally mounted post located in the center of said plot, a frame hinged at its inner end to said post, a swivel joint in said frame near its inner end, support wheels secured to said frame and adapted to travel on said runway, means to insure the line of travel of the wheels concentric with said post, and soil working implements carried by said frame.

10. In a device of the character described, the combination with a smooth runway built in a field, of a frame to which soil tilling implements may be secured, blocks slidably mounted on the under face of said frame, journal bearings pivotally mounted in said blocks, a support wheel journaled in said bearings, said wheel being adapted to travel on said runway and means to insure the true line of draft of said wheel.

In testimony whereof I affix my signature.

GILBERT TOMPKINS.